US011119866B2

(12) United States Patent
Behera et al.

(10) Patent No.: US 11,119,866 B2
(45) Date of Patent: Sep. 14, 2021

(54) METHOD AND SYSTEM FOR INTELLIGENTLY MIGRATING TO A CENTRALIZED PROTECTION FRAMEWORK

(71) Applicant: EMC IP Holding Company LLC, Hopkinton, MA (US)

(72) Inventors: Amarendra Behera, Bangalore (IN); Gururaj Soma, Bangalore (IN); Tushar B. Dethe, Bangalore (IN); Himanshu Arora, Bangalore (IN); Krishnendu Bagchi, Bangalore (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 35 days.

(21) Appl. No.: 16/670,696

(22) Filed: Oct. 31, 2019

(65) Prior Publication Data

US 2021/0133042 A1    May 6, 2021

(51) Int. Cl.
*G06F 12/00*    (2006.01)
*G06F 11/14*    (2006.01)

(52) U.S. Cl.
CPC ...... *G06F 11/1464* (2013.01); *G06F 11/1435* (2013.01); *G06F 11/1451* (2013.01); *G06F 11/1461* (2013.01); *G06F 11/1469* (2013.01)

(58) Field of Classification Search
CPC ............. G06F 11/1461; G06F 11/1469; G06F 11/1466; G06F 11/1451; G06F 11/1464; G06F 11/1435
See application file for complete search history.

(56) References Cited

U.S. PATENT DOCUMENTS

| 10,061,657 | B1 * | 8/2018 | Chopra | ............... G06F 11/1461 |
| 2007/0094378 | A1 * | 4/2007 | Baldwin | ................ H04L 29/06 709/223 |
| 2008/0052326 | A1 * | 2/2008 | Evanchik | ............ G06F 11/1464 |
| 2016/0188417 | A1 * | 6/2016 | Karinta | ............... G06F 11/1451 707/654 |

* cited by examiner

Primary Examiner — Arvind Talukdar
(74) Attorney, Agent, or Firm — Chamberlain, Hrdlicka, White, Williams & Aughtry (57) ABSTRACT

A method and system for intelligently migrating to a centralized protection framework. Specifically, the disclosed method and system entail redirecting the target of asset backup operations for any given asset from one or more legacy backup devices to a centrally-managed backup device.

20 Claims, 8 Drawing Sheets

METHOD AND SYSTEM FOR INTELLIGENTLY MIGRATING TO A CENTRALIZED PROTECTION FRAMEWORK

BACKGROUND

Presently, the migration of backup targets from multiple storage units to a single centrally-managed storage unit is an extensive process usually requiring modifications to innumerable individual command line instructions handling backup operations for innumerable assets, respectively.

SUMMARY

In general, in one aspect, the invention relates to a method for centralized asset protection migration, comprising: detecting a first backup operation trigger instigating a first backup operation targeting a first asset; in response to detecting the first backup operation trigger: identifying a first service to which the first asset belongs; making a first determination that a client device manager presently maintains a first service-asset map for the first service; receiving, from the client device manager, centralized protection information in response to a first query issued thereto based on the first determination; and performing the first backup operation at least based on the centralized protection information.

In general, in one aspect, the invention relates to a system, comprising: a client device manager comprising a first computer processor; a client device operatively connected to the client device manager and comprising a second computer processor and an asset; and a service and a backup agent both executing on the second computer processor, wherein the backup agent is programmed to: detect a backup operation trigger instigating a backup operation targeting the asset; in response to detecting the first backup operation trigger: identify the service to which the asset belongs; make a determination that the client device manager presently maintains a service-asset map for the service; receive, from the client device manager, centralized protection information in response to a query issued thereto based on the determination; and perform the backup operation at least based on the centralized protection information.

In general, in one aspect, the invention relates to a non-transitory computer readable medium (CRM) comprising computer readable program code, which when executed by a computer processor, enables the computer processor to: detect a first backup operation trigger instigating a first backup operation targeting a first asset; in response to detecting the first backup operation trigger: identify a first service to which the first asset belongs; make a first determination that a client device manager presently maintains a first service-asset map for the first service; receive, from the client device manager, centralized protection information in response to a first query issued thereto based on the first determination; and perform the first backup operation at least based on the centralized protection information.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for intelligently migrating to a centralized protection framework. Specifically, one or more embodiments of the invention entails redirecting the target of asset backup operations for any given asset from one or more legacy backup devices to a centrally-managed backup device. One or more embodiments of the invention enable a user to centrally manage backups of data in various locations from a centralized location instead of interacting directly with each of the locations at which the data is located. Further, embodiments of the invention enable the user to perform various administrative tasks to configure and perform the backup operations across multiple location from a common management location.

Figure 1A:
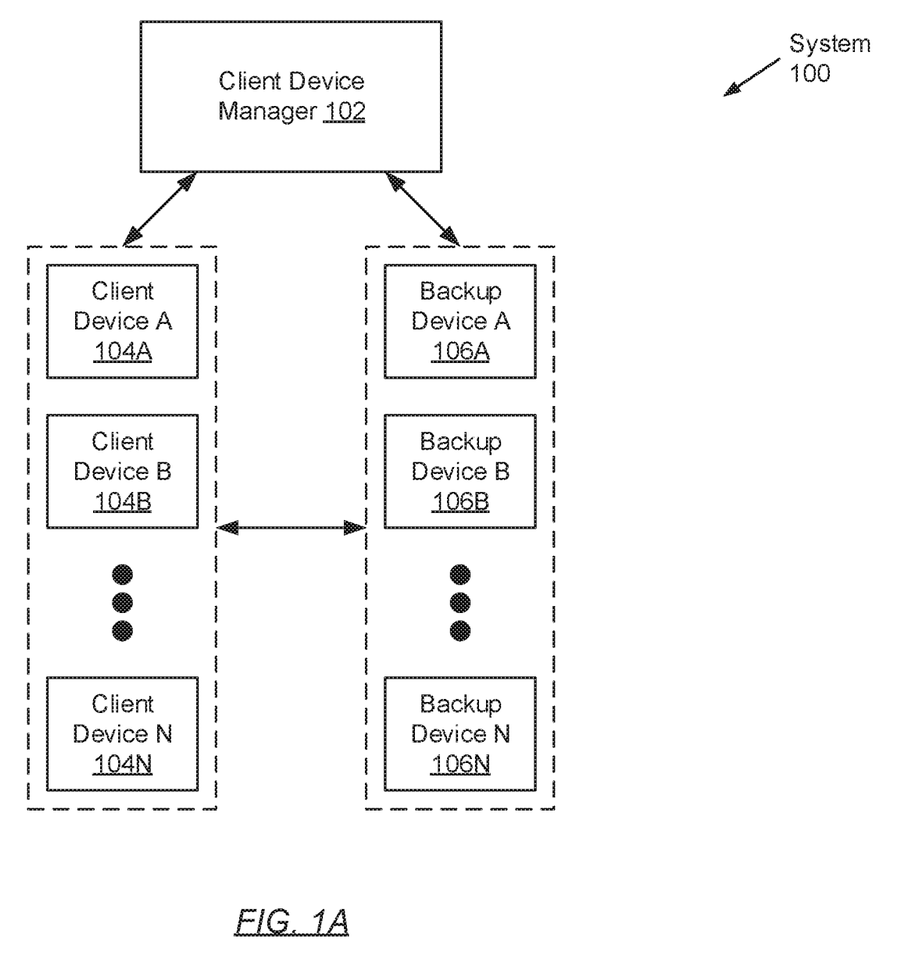
FIG. 1A shows a system in accordance with one or more embodiments of the invention.

FIG. 1A shows a system in accordance with one or more embodiments of the invention. The system (100) may include a client device manager (102), one or more client devices (104A-104N), and one or more backup devices (106A-106N). Each of these system (100) components is described below.

In one embodiment of the invention, the above-mentioned system (100) components may operatively connect to one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled components (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, the client device manager (102) may represent a monitoring and management system, which may at least be responsible for centralizing client device (104A-104N) administration and/or operations. To that extent, the client device manager (102) may include functionality to: receive centralized protection queries from the client device(s) (104A-104N); and issue query responses to the client device(s) (104A-104N) by processing the received centralized protection queries. The query responses may or may not disclose configuration parameters and/or instructions for intelligently migrating one or more assets to a centralized protection framework—i.e., re-directing the target of asset backup operations to a centrally-managed backup device (e.g., a designated backup device of the backup device(s) (106A-106N)). One of ordinary skill will appreciate that the client device manager (102) may perform other functionalities without departing from the scope of the invention.

In one embodiment of the invention, the client device manager (102) may be implemented using one or more servers (not shown). Each server may reflect a physical server that may reside in a datacenter, or a virtual server that may reside in a cloud computing environment. Additionally or alternatively, the client device manager (102) may be implemented using one or more computing systems similar to the exemplary computing system shown in FIG. 4. Moreover, the client device manager (102) is described in further detail below with respect to FIG. 1B.

In one embodiment of the invention, a client device (104A-104N) may represent any physical computing system designed and configured to receive, generate, process, store, and/or transmit data, as well as to provide an environment in which one or more computer programs (not shown) may execute thereon. The computer program(s) may, for example, implement large-scale and complex data processing; or implement one or more services offered locally or over the network. Further, in providing an execution environment for the computer program(s) installed thereon, a client device (104A-104N) may include and allocate various resources (e.g., computer processors, memory, storage, virtualization, network bandwidth, etc.), as needed, to the computer program(s) and the task(s) (process(es)) instantiated thereby. One of ordinary skill will appreciate that a client device (104A-104N) may perform other functionalities without departing from the scope of the invention. Examples of a client device (104A-104N) may include, but are not limited to, a desktop computer, a workstation computer, a server, a mainframe, or any other computing system similar to the exemplary computing system shown in FIG. 4. Moreover, any client device (104A-104N) is described in further detail below with respect to FIG. 1C.

In one embodiment of the invention, a backup device (106A-106N) may represent a data backup, archiving, and/or disaster recovery storage system. To that extent, a backup device (106A-106N) may at least be designed and configured to: receive and store asset copies from the client device(s) (104A-104N) during asset backup operations; and retrieve and restore the asset copies onto the client device(s) (104A-104N) during asset recovery operations. One of ordinary skill will appreciate that a backup device (106A-106N) may perform other functionalities without departing from the scope of the invention. Furthermore, a backup device (106A-106N) may be implemented using one or more servers (not shown). Each server may reflect a physical server that may reside in a datacenter, or a virtual server that may reside in a cloud computing environment. Additionally or alternatively, a backup device (106A-106N) may be implemented using one or more computing systems similar to the exemplary computing system shown in FIG. 4. Moreover, any backup device (106A-106N) is described in further detail below with respect to FIG. 1D.

In one embodiment of the invention, one (e.g., a second backup device (106B)) of the backup device(s) (106A-106N) may be designated as a centrally-managed backup device. A centrally-managed backup device may refer to a backup device (106A-106N) that is managed centrally, rather than at a per-backup device level. For example, the backup operations for the centrally-managed backup device may be managed by the client device manager and/or obtains information related to performing the backup operation from the client device manager.

Further, at least one (or the remainder) of the backup device(s) (106A-106N) may be designated as non-centrally-managed backup devices. A non-centrally-managed backup device may refer to a backup device (106A-106N) that is locally managed such that it manages its own backup operations instead of having its backup operations managed by, e.g., the client device manager.

While FIG. 1A shows a configuration of components, other system (100) configurations may be used without departing from the scope of the invention.

Figure 1B:
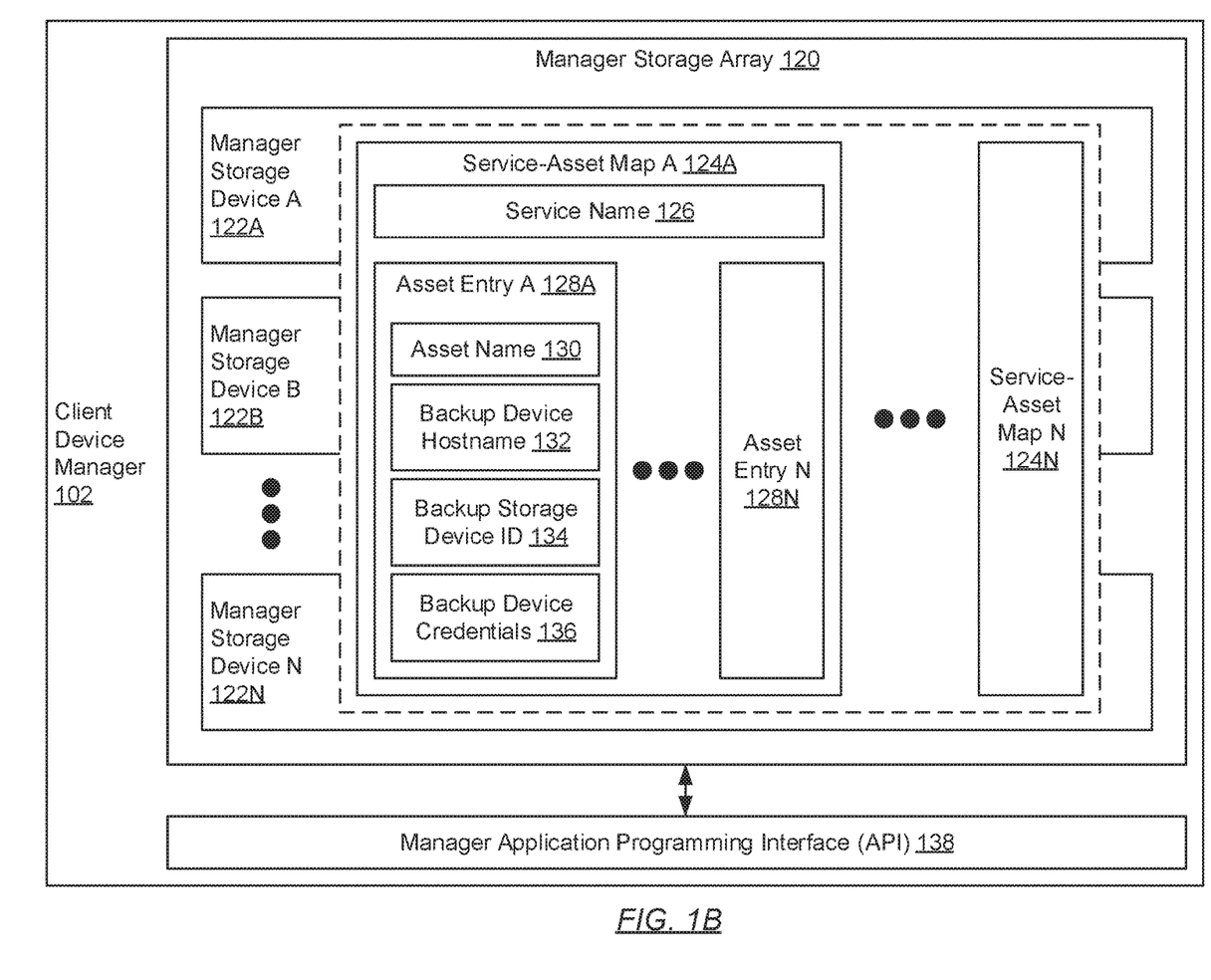
FIG. 1B shows a client device manager in accordance with one or more embodiments of the invention.

FIG. 1B shows a client device manager in accordance with one or more embodiments of the invention. The client device manager (102) may include a manager storage array (120) and a manager application programming interface (API) (138). Each of these client device manager (102) subcomponents is described below.

In one embodiment of the invention, the manager storage array (120) may refer to physical data storage across which various forms of data—e.g., one or more service-asset maps (124A-124N) (described below)—may be maintained. The manager storage array (120) may be implemented using one or more manager storage devices (122A-122N). Each manager storage device (122A-122N) may encompass non-transitory computer readable storage media on which data may be stored in whole or in part, and temporarily or permanently. Further, each manager storage device (122A-122N) may be designed and configured based on a common or different storage device technology—examples of which may include, but are not limited to, flash based storage devices, fibre-channel (FC) based storage devices, serial-attached small computer system interface (SCSI) (SAS)

based storage devices, and serial advanced technology attachment (SATA) storage devices. Moreover, any subset or all of the manager storage array (120) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, a service-asset map (124A-124N) may refer to a data object (e.g., a data file, a data structure, or a composite data variable) used for tracking backup device (106A-106N) metadata descriptive of one or more backup devices (106A-106N). Each service-asset map (124A-124N) may pertain to a given service (not shown) (see e.g., FIG. 1C) executing on a client device (104A-104N) and, accordingly, may include a service name (126) specified therein. The service name (126) may refer to a character string (e.g., a sequence of letters, numbers, symbols, any combination thereof, etc.) assigned to, and subsequently used to uniquely identify, the given service.

In one embodiment of the invention, each service-asset map (124A-124N) may maintain the above-mentioned backup device (106A-106N) metadata across one or more asset entries (128A-128N). Further, each asset entry (128A-128N) may store backup device (106A-106N) metadata for a given backup device (106A-106N) targeted for backup operations by a given asset (not shown) (see e.g., FIG. 1C) belonging to the given service. A given service-asset map (124A-124N) may or may not include a respective asset entry (128A-128N) for each and every asset belonging to a given service with which the given service-asset map (124A-124N) may be associated. Moreover, any asset entry (128A-128N) may disclose an asset name (130) and backup device (106A-106N) metadata, at least in the form of a backup device hostname (132), a backup storage device identifier (134), and backup device credentials (136). Each of these asset entry (128A-128N) subcomponents is described below.

In one embodiment of the invention, the asset name (130) may refer to a character string (e.g., a series of letters, numbers, symbols, any combination thereof, etc.) assigned to, and subsequently used to uniquely identify, a given asset belonging to a given service. The backup device hostname (132), on the other hand, may refer to a label (e.g., a character string) assigned to a given backup device (106A-106N), which may be used to uniquely identify the given backup device (106A-106N) across the network (not shown). Furthermore, the backup storage device identifier (134) may refer to another character string assigned to, and subsequently used to uniquely identify, a given backup storage device (not shown) (see e.g., FIG. 1D) residing on the given backup device (106A-106N). Lastly, the backup device credentials (136) may refer to authentication information (e.g., username, password, certificate, etc.) necessary to establish a connection to the given backup device (106A-106N) and, thereafter, store any asset copies for the given asset therein.

In one embodiment of the invention, the manager API (138) may refer to a logical interface or interactivity protocol, which may be designed and configured to facilitate communications between the client device manager (102) and external entities (e.g., the client device(s) (104A-104N) and/or the backup device(s) (106A-106N)). To that extent, the manager API (138) may include functionality to perform any subset or all of the various steps outlined below with respect to FIG. 3, which may be directed to processing centralized protection queries. Further, one of ordinary skill will appreciate that the manager API (138) may perform other functionalities without departing from the scope of the invention.

While FIG. 1B shows a configuration of components, other client device manager (102) configurations may be used without departing from the scope of the invention.

Figure 1C:
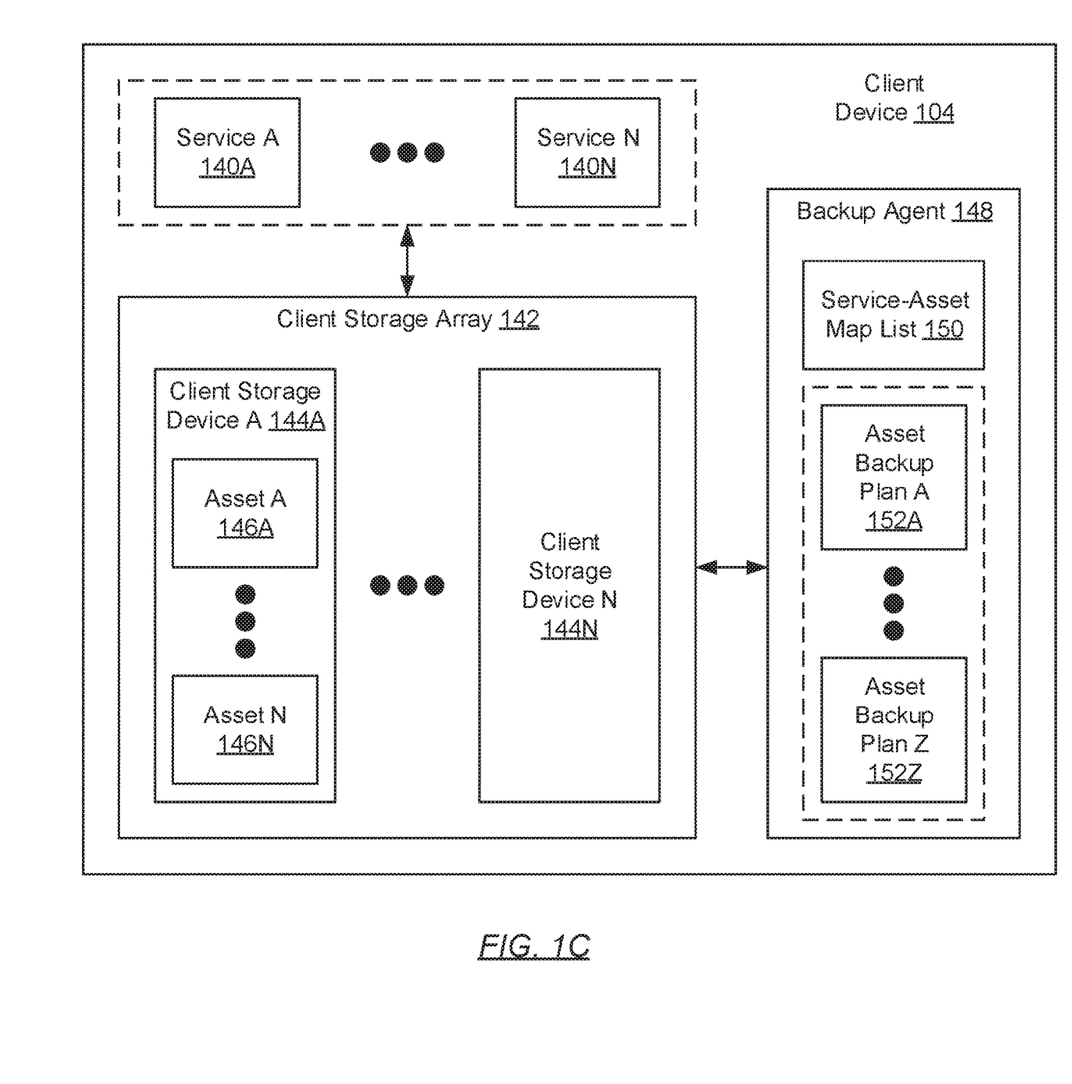
FIG. 1C shows a client device in accordance with one or more embodiments of the invention.

FIG. 1C shows a client device in accordance with one or more embodiments of the invention. The client device (104) may include one or more services (140A-140N), a client storage array (142), and a backup agent (148). Each of these client device (104) subcomponents is described below.

In one embodiment of the invention, a service (140A-140N) may represent a database management system instance (e.g., a computer program), which may execute on the underlying hardware of the client device (104) as an operating system service. Each service (140A-140N) may manage one or more databases (also referred to as assets), which may maintain both system-pertinent and user-defined information and metadata. Further, any given service (140A-140N) may include functionality to enable client device (104) users to store and query data across the asset(s) respective to the given service (140A-140N). One of ordinary skill will appreciate that a service (140A-140N) may perform other functionalities without departing from the scope of the invention.

In one embodiment of the invention, the client storage array (142) may refer to physical data storage across which various forms of data—e.g., one or more assets (146A-146N) (described below)—may be maintained. The client storage array (142) may be implemented using one or more client storage devices (144A-144N). Each client storage device (144A-144N) may encompass non-transitory computer readable storage media on which data may be stored in whole or in part, and temporarily or permanently. Further, each client storage device (144A-144N) may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the client storage array (142) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, an asset (146A-146N) may represent a database, or a logical container to and from which related data may be stored and retrieved, respectively. An asset (146A-146N) may occupy a portion of a client storage device (144A-144N) or, alternatively, may span across multiple client storage devices (144A-144N), of the client storage array (142). Furthermore, an asset (146A-146N) may refer to a composite of various database objects (not shown) including, but not limited to, one or more data files, one or more control files, and one or more redo log files.

In one embodiment of the invention, a data file may refer to a database object for storing database data. Database data may encompass computer readable content (e.g., images, text, video, audio, machine code, any other form of computer readable content, or a combination thereof). A control file may refer to a database object for storing asset (146A-146N) metadata (also referred to as database metadata). Database metadata may encompass information descriptive of the database (or asset (146A-146N)) status and structure. By way of examples, database metadata may include, but are not limited to, a database name assigned to the asset (146A-146N), the name(s) and storage location(s) of one or more data files and redo log files associated with the asset (146A-146N), a creation timestamp encoding the date and/or time marking the creation of the asset (146A-146N), a log sequence number associated with a current redo log file, etc. Moreover, a redo log file may refer to a database object for storing a history of changes made to the database data. A redo log file may include one or more redo entries (or redo records), which may include a set of change vectors. Each change vector subsequently describes or represents a modification made to a single asset (146A-146N) data block. Furthermore, a redo log file may serve to recover the asset (146A-146N) should a failover occur, or to apply recent changes to a recovered asset (146A-146N) which may have transpired during the database recovery process.

In one embodiment of the invention, the backup agent (148) may refer to a computer program that may execute on the underlying hardware of the client device (104). Specifically, the backup agent (148) may be designed and configured to facilitate asset (146A-146N) backup operations. To that extent, the backup agent (148) may perform the various steps outlined below with respect to FIGS. 2A and 2B, which may be directed to intelligently migrating the target of asset backup operations to a centralized protection framework (i.e., a centrally managed backup device). One of ordinary skill will appreciate that the backup agent (148) may perform other functionalities without departing from the scope of the invention.

In one embodiment of the invention, in facilitating asset (146A-146N) backup operations, the backup agent (148) may maintain and/or access a service-asset map list (150), which may be stored in memory (not shown) or in the client storage array (142). The service-asset map list (150) may refer to a data object (e.g., a data file, a data structure, or a composite data variable) that may indicate (or identify) a set of service-asset maps (described above) (see e.g., FIG. 1B) that may be presently residing on the client device manager (102). Within the service-asset map list (150), each service-asset map—presently residing on the client device manager (102)—may be represented by a service name assigned to a service (140A-140N) associated with the service-asset map. Further, the service name(s), recorded in the service-asset map list (150), may pertain to services (140A-140N) executing on the client device (104) or, alternatively, may pertain to services (140A-140N) executing on multiple client devices (104A-104N).

In one embodiment of the invention, in facilitating asset (146A-146N) backup operations, the backup agent (148) may further maintain and/or access one or more asset backup plans (152A-152N), which may also be stored in memory or in the client storage array (142). An asset backup plan (152A-152N) may refer to a data object (e.g., a data file, a data structure, or a composite data variable) that may store configuration and/or operational metadata descriptive of backup operations concerning a given asset (146A-146N) maintained on the client device (104). By way of examples, an asset backup plan (152A-152N) may include, but is not limited to, backup device (106A-106N) metadata (e.g., backup device hostname, backup storage device identifier, backup device credentials, etc. (all described above) (see e.g., FIG. 1B)) descriptive of a target backup device (106A-106N) to which asset copies of a given asset (146A-146) may be directed and stored; and protection policy metadata (e.g., backup operation periodicity, data retention length, deduplication and/or compression details (if any), backup type (e.g., full, incremental, differential), etc.).

While FIG. 1C shows a configuration of components, other client device (104) configurations may be used without departing from the scope of the invention.

Figure 1D:
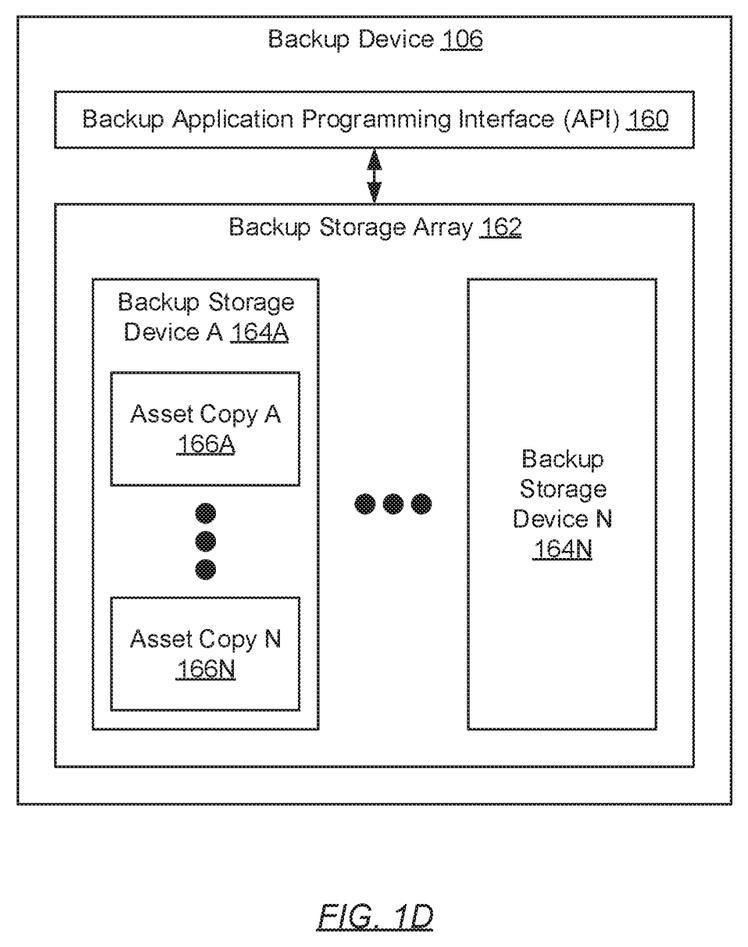
FIG. 1D shows a backup device in accordance with one or more embodiments of the invention.

FIG. 1D shows a backup device in accordance with one or more embodiments of the invention. The backup device (106) may include a backup application programming interface (API) (160) and a backup storage array (162). Each of these backup device (106) subcomponents is described below.

In one embodiment of the invention, the backup API (160) may refer to a logical interface or interactivity protocol, which may be designed and configured to facilitate communications between the backup device (106) and external entities (e.g., the client device(s) (104A-104N) and/or the client device manager (102)). To that extent, the backup API (160) may include functionality to: receive one or more asset copies (described below) from the client device(s) (104A-104N) and, subsequently, store the asset copies in the backup storage array (162) during asset backup operations; and retrieve one or more asset copies from the backup storage array (162) and, subsequently, provide back the asset copies to the client device(s) (104A-104N) during asset recovery operations. Further, one of ordinary skill will appreciate that the backup API (160) may perform other functionalities without departing from the scope of the invention.

In one embodiment of the invention, the backup storage array (162) may refer to physical data storage across which various forms of data—e.g., one or more asset copies (166A-166N) (described below)—may be maintained. The backup storage array (162) may be implemented using one or more backup storage devices (164A-164N). Each backup storage device (164A-164N) may encompass non-transitory computer readable storage media on which data may be stored in whole or in part, and temporarily or permanently. Further, each backup storage device (164A-164N) may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the backup storage array (162) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, an asset copy (166A-166N) may refer to one or more backup copies of a given asset (146A-146N) (see e.g., FIG. 1C). Accordingly, an asset copy (166A-166N) may similarly represent a database, or a logical container to and from which related data, or any granularity thereof, may be stored and retrieved, respectively. An asset copy (166A-166N) may occupy a portion of a backup storage device (164A-164N) or, alternatively, may span across multiple backup storage devices (164A-164N), of the backup storage array (162). Furthermore, similar to an asset (146A-146N), an asset copy (166A-166N) may refer to a composite of various database objects including, but not limited to, one or more data files, one or more control files, and one or more redo log files (all described above) (see e.g., FIG. 1C).

While FIG. 1D shows a configuration of components, other backup device (106) configurations may be used without departing from the scope of the invention.

Figure 2A:
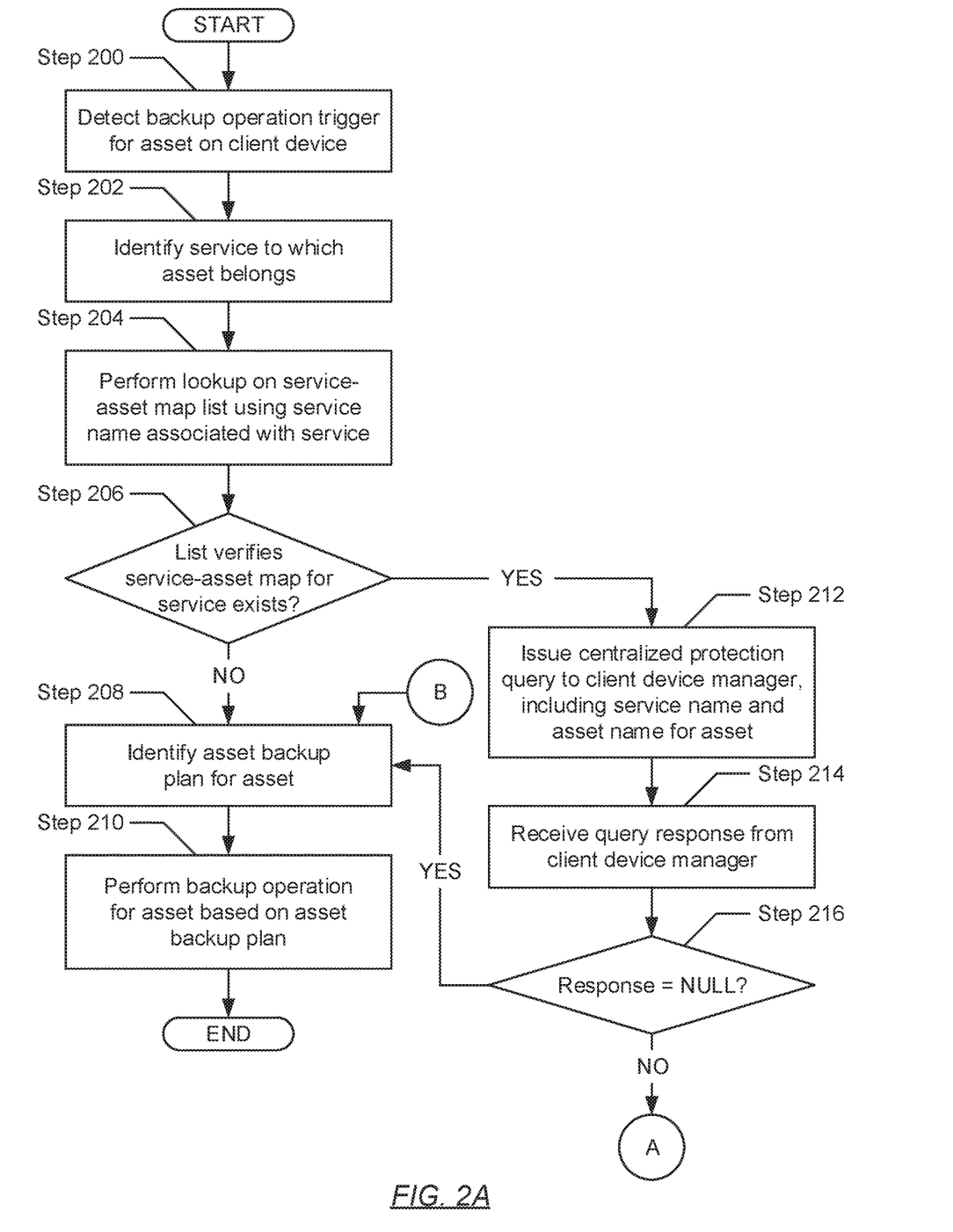
FIGS. 2A and 2B show flowcharts describing a method for intelligently migrating to a centralized protection framework in accordance with one or more embodiments of the invention.
Figure 2B:
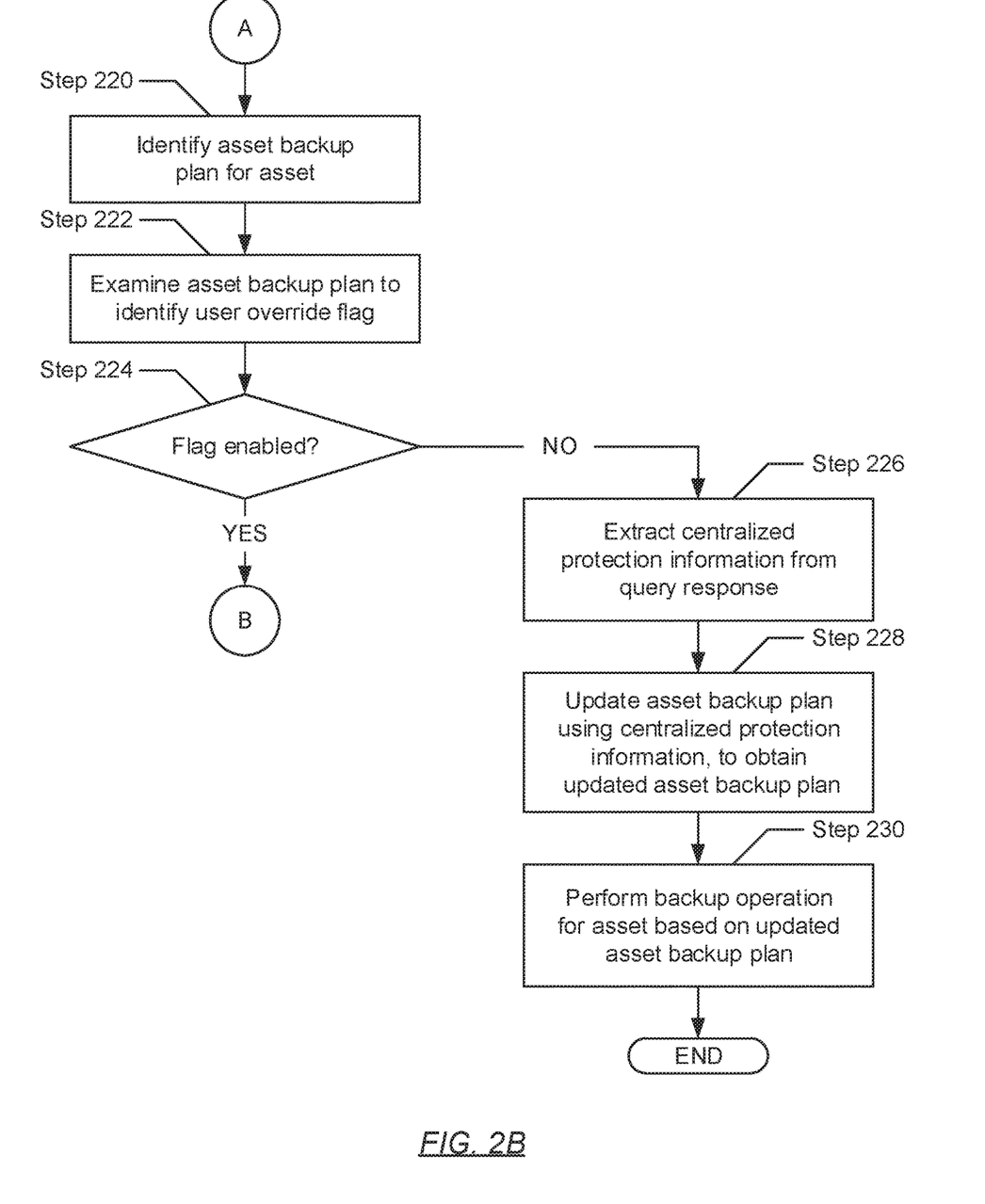

FIGS. 2A and 2B show flowcharts describing a method for intelligently migrating to a centralized protection framework in accordance with one or more embodiments of the invention. The various steps outlined below may be performed by the backup agent on a client device (see e.g., FIG. 1C). Further, while the various steps in the flowcharts are presented and described sequentially, one of ordinary skill will appreciate that some or all steps may be executed in different orders, may be combined or omitted, and some or all steps may be executed in parallel.

Turning to FIG. 2A, in Step 200, a backup operation trigger is detected. In one embodiment of the invention, the backup operation trigger may refer to an event that may initiate an asset backup operation. The event may manifest as an on-demand request by a user of the client device or, alternatively, as a scheduled task denoted in an asset backup plan (described above) (see e.g., FIG. 1C). Further, the backup operation trigger may correspond to a given asset (i.e., database) maintained on the client device and, accordingly, may disclose an asset name associate with the given asset.

In Step 202, a service (described above) (see e.g., FIG. 1C), to which the asset (for which the backup operation trigger had been detected in Step 200) belongs, is identified. Specifically, in one embodiment of the invention, the abovementioned asset name, associated with the given asset, may be mapped to a service name associated with a service that may be executing on the client device.

In Step 204, a lookup is performed on a service-asset map list (described above) (see e.g., FIG. 1C) using the service name (identified in Step 202). Thereafter, in Step 206, based on the lookup (performed in Step 204), a determination is made as to whether a service-asset map, for the abovementioned service, presently exists on the client device manager (see e.g., FIG. 1B). The determination may entail comparing the service name to each listed service name specified in the service-asset map list, and either finding a match (indicative that a service-asset map for the service presently exists on the client device manager) or not finding a match (indicative that a service-asset map for the service presently does not exist on the client device manager). Accordingly, in one embodiment of the invention, if it is determined, based on the lookup, that the service name is specified in the service-asset map list, then the process proceeds to Step 212. On the other hand, in another embodiment of the invention, if it is alternatively determined, based on the lookup, that the service name is not specified in the service-asset map list, then the process alternatively proceeds to Step 208.

In Step 208, upon determining (in Step 206) that the service name (identified in Step 202) is not specified in the service-asset map list (based on the lookup performed in Step 204), an asset backup plan for the given asset is identified. In one embodiment of the invention, the aforementioned asset backup plan may be identified, from a set of asset backup plans maintained on the client device, using the asset name associated with the given asset.

In Step 210, a backup operation for the given asset is performed based on metadata disclosed in the asset backup plan (identified in Step 208). More specifically, in one embodiment of the invention, any granularity of the given asset (specified in the metadata) may be replicated to obtain an asset copy, which may then be steered towards a backup device for storage. The backup device (specified in the metadata) may or may not be a designated, centrally-managed backup device.

In Step 212, upon alternatively determining (in Step 206) that the service name (identified in Step 202) is specified in the service-asset map list (based on the lookup performed in Step 204), a centralized protection query is issued. In one embodiment of the invention, the centralized protection query may be directed to the client device manager and may include the service name and asset name.

In Step 214, as a reply to the centralized protection query (issued in Step 212), a query response is received from the client device manager. In Step 216, a determination is made as to whether the query response (received in Step 214) includes a NULL value. The determination may entail examining the query response. Accordingly, in one embodiment of the invention, if it is determined that the query response discloses a NULL value, then the process proceeds to Step 208 (described above). On the other hand, in another embodiment of the invention, if it is alternatively determined that the query response discloses information other than the aforementioned NULL value, then the process alternatively proceeds to Step 220 (see e.g., FIG. 2B).

Turning to FIG. 2B, in Step 220, upon determining (in Step 216) that the query response (received in Step 214) discloses information other than a NULL value, an asset backup plan for the given asset (to which the backup operation trigger detected in Step 200 is directed) is identified. In one embodiment of the invention, the aforementioned asset backup plan may be identified, from a set of asset backup plans maintained on the client device, using the asset name associated with the given asset.

In Step 222, the asset backup plan (identified in Step 220) is subsequently examined. In one embodiment of the invention, the examination may result in the identification of a user override flag specified therein. The user override flag may reference a user-defined parameter, which may reflect a Boolean (i.e., true or false) value indicative of whether a user of the client device wishes not to redirect the target of the backup operation to a designated, centrally-managed backup device.

In Step 224, a determination is made as to whether the user override flag (identified in Step 222) is enabled—e.g., reflects a TRUE Boolean value. Accordingly, in one embodiment of the invention, if it is determined that the user override flag is enabled, then the process proceeds to Step 208 (described above) (see e.g., FIG. 2A). On the other hand, in another embodiment of the invention, if it is alternatively determined that the user override flag is disabled—e.g., reflects a FALSE Boolean value—then the process alternatively proceeds to Step 226.

In Step 226, upon determining (in Step 224) that the user override flag (identified in Step 222) is disabled, centralized protection information is extracted from the query response (received in Step 214). In one embodiment of the invention, the centralized protection information may disclose backup device metadata descriptive of a designated, centrally-managed backup device to which a result (i.e., asset copy) of the backup operation should be directed for storage. More specifically, the centralized protection information may include, but is not limited to, a backup device hostname assigned to the designated, centrally-managed backup device, a backup storage device identifier assigned to a backup storage device residing on the designated, centrally-managed backup device, and backup device credentials for connecting to and/or accessing the designated, centrally-managed backup device.

In Step 228, the asset backup plan (identified in Step 220), for the given asset, is updated using the centralized protection information (extracted in Step 226). That is, in one embodiment of the invention, the existing backup device metadata maintained in the asset backup plan may be replaced with the disclosed backup device metadata, descriptive of a designated, centrally-managed backup device, that may embody the centralized protection information. Further, upon updating the asset backup plan using the centralized protection information, an updated asset backup plan may be obtained.

In Step 230, a backup operation for the given asset is performed based on metadata disclosed in the updated asset backup plan (obtained in Step 228). More specifically, in one embodiment of the invention, any granularity of the given asset (specified in the metadata) may be replicated to obtain an asset copy, which may then be steered towards a backup device for storage. The backup device (specified in the metadata) may be the designated, centrally-managed backup device with which the centralized protection information may be associated.

Figure 3:
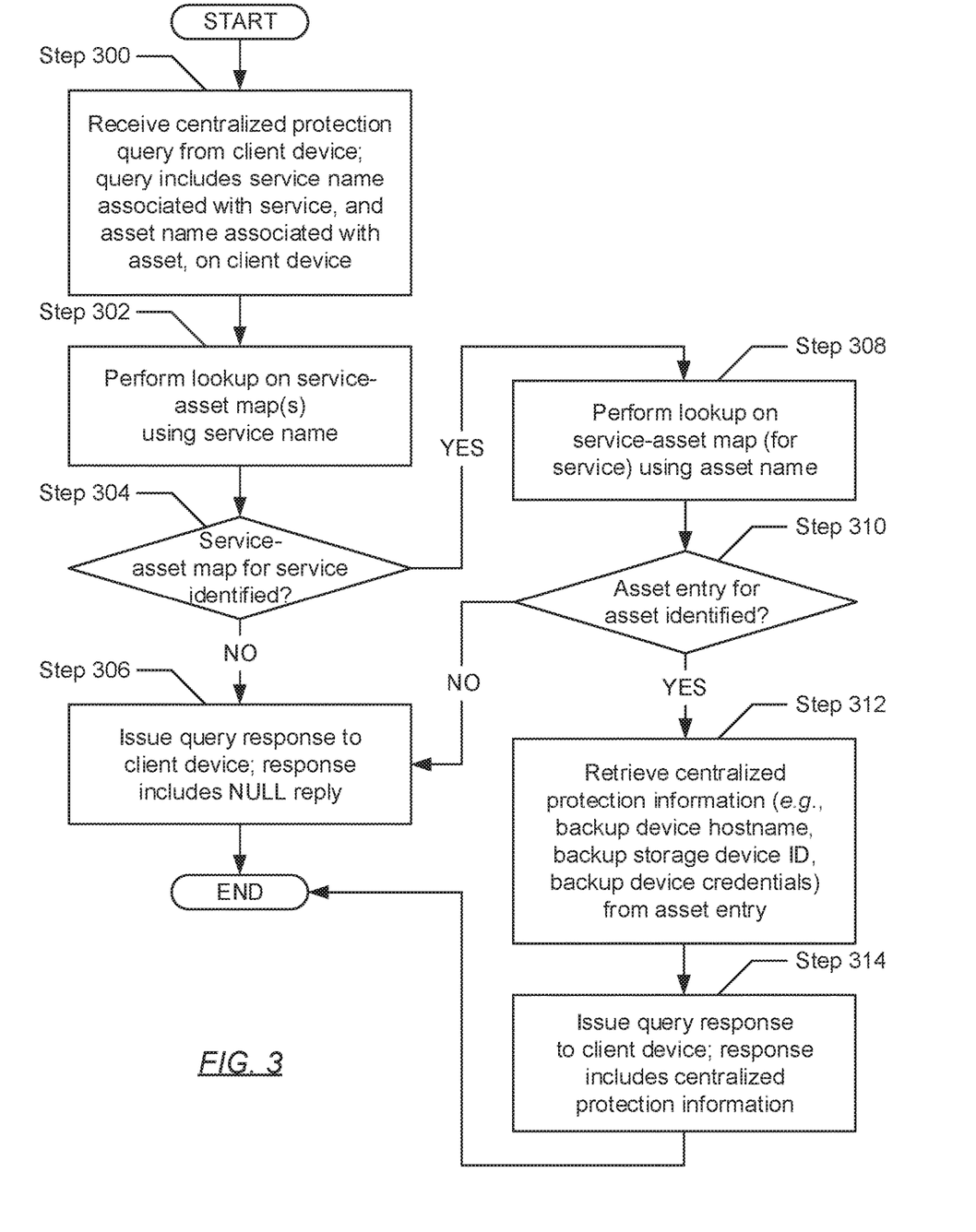
FIG. 3 shows a flowchart describing a method for processing a centralized protection query in accordance with one or more embodiments of the invention.

FIG. 3 shows a flowchart describing a method for processing a centralized protection query in accordance with one or more embodiments of the invention. The various steps outlined below may be performed by the client device manager (see e.g., FIGS. 1A and 1B). Further, while the various steps in the flowcharts are presented and described sequentially, one of ordinary skill will appreciate that some or all steps may be executed in different orders, may be combined or omitted, and some or all steps may be executed in parallel.

Turning to FIG. 3, in Step 300, a centralized protection query is received from a client device or, more specifically, from the backup agent executing on the client device. In one embodiment of the invention, the centralized protection query may include a service name associated with a service (described above) (see e.g., FIG. 1C) running on the client device, and an asset name associated with an asset belonging to the service.

In Step 302, a lookup is performed across a set of service-asset maps using the service name (received in Step 300). Thereafter, in Step 304, based on the lookup (performed in Step 302), a determination is made as to whether a service-asset map (see e.g., FIG. 1B), for the above-mentioned service, presently exists on the client device manager. The determination may entail comparing the service name to a denoted service name specified in each service-asset map maintained on the client device manager, and either finding a match (indicative that a service-asset map for the service presently exists on the client device manager) or not finding a match (indicative that a service-asset map for the service presently does not exist on the client device manager). Accordingly, in one embodiment of the invention, if it is determined, based on the lookup, that the service name matches a denoted service name specified in a service-asset map, then the process proceeds to Step 308. On the other hand, in another embodiment of the invention, if it is alternatively determined, based on the lookup, that the service name does not match the denoted service name specified in any of the maintained service-asset maps, then the process alternatively proceeds to Step 306.

In Step 306, upon determining (in Step 304) that a service-asset map associated with the service name (received in Step 300) presently does not exist on the client device manager, a query response is issued as a reply to the centralized protection query (received in Step 300). In one embodiment of the invention, the query response may be directed to the client device (from which the centralized protection query had been received) and may include a NULL value.

In Step 308, upon alternatively determining (in Step 304) that a service-asset map associated with the service name (received in Step 300) presently exists on the client device manager, a lookup is performed on the service-asset map using the asset name (also received in Step 300). Thereafter, in Step 310, based on the lookup (performed in Step 308), a determination is made as to whether an asset entry (described above) (see e.g., FIG. 1B), for the above-mentioned asset, is included in the service-asset map. The determination may entail comparing the asset name to a denoted asset name specified in each asset entry included in the service-asset map, and either finding a match (indicative that the service-asset map includes an asset entry for the asset) or not finding a match (indicative that service-asset map does not include an asset entry for the asset). Accordingly, in one embodiment of the invention, if it is determined, based on the lookup, that the asset name matches a denoted asset name specified in an asset entry of the service-asset map, then the process proceeds to Step 312. On the other hand, in another embodiment of the invention, if it is alternatively determined, based on the lookup, that the asset name does not match the denoted asset name specified in any of the maintained asset entries of the service-asset map, then the process alternatively proceeds to Step 306.

In Step 312, upon determining (in Step 310) that the service-asset map (identified based on the lookup performed in Step 302) includes an asset entry for a given asset, centralized protection information is retrieved from the asset entry. In one embodiment of the invention, the centralized protection information may disclose backup device metadata descriptive of a designated, centrally-managed backup device. More specifically, the centralized protection information may include, but is not limited to, a backup device hostname assigned to the designated, centrally-managed backup device, a backup storage device identifier assigned to a backup storage device residing on the designated, centrally-managed backup device, and backup device credentials for connecting to and/or accessing the designated, centrally-managed backup device.

In Step 314, a query response is issued as a reply to the centralized protection query (received in Step 300). In one embodiment of the invention, the query response may be directed to the client device (from which the centralized protection query had been received) and may include the centralized protection information (retrieved in Step 312).

Figure 4:
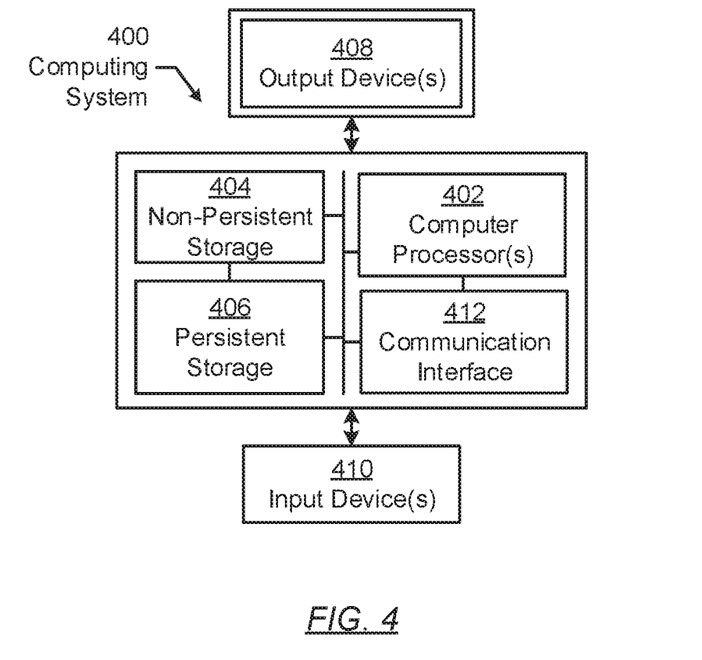
FIG. 4 shows an exemplary computing system in accordance with one or more embodiments of the invention.

FIG. 4 shows an exemplary computing system in accordance with one or more embodiments of the invention. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one embodiment of the invention, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for centralized asset protection migration, comprising:
   detecting a first backup operation trigger instigating a first backup operation targeting a first asset for backup to a non-centrally managed backup device;
   in response to detecting the first backup operation trigger:
     identifying a first service to which the first asset belongs;
     making a first determination that a client device manager presently maintains a first service-asset map for the first service;
     receiving, from the client device manager, centralized protection information in response to a first query issued thereto based on the first determination; and
     performing an updated first backup operation at least based on the centralized protection information, wherein the updated first backup operation backs up the first asset to a centrally-managed backup device instead of the non-centrally managed backup device.

2. The method of claim 1, wherein the first service is a database management system instance.

3. The method of claim 1, wherein making the first determination, comprises:
   performing a lookup across a service-asset map list using a service name associated with the first service; and
   matching the service name to a listed service name of a listed service name set disclosed in the service-asset map list.

4. The method of claim 1, further comprising:
   prior to receiving the centralized protection information:
     issuing, based on the first determination and to the client device manager, a query comprising a service name associated with the first service and an asset name associated with the first asset,
     wherein the client device manager presently maintains the first service-asset map for the first service identified by the service name,
     wherein the first service-asset map comprises an asset entry identified by the asset name.

5. The method of claim 1, wherein the centralized protection information comprises backup device metadata identifying the centrally-managed backup device for storing an asset copy of the first asset produced during the first updated backup operation.

6. The method of claim 5, wherein the backup device metadata comprises a backup device hostname associated with the centrally-managed backup device, a backup storage device identifier associated with a backup storage device residing on the centrally-managed backup device, and backup device credentials for accessing the centrally-managed backup device.

7. The method of claim 1, further comprising:
   prior to performing the updated first backup operation:
     identifying an asset backup plan for the first asset;
     examining the asset backup plan to identify a user override flag; and
     proceeding, based on the user override flag reflecting a disabled state, with the updated first backup operation at least based on the centralized protection information.

8. The method of claim 1, further comprising:
   detecting a second backup operation trigger instigating a second backup operation targeting a second asset;
   in response to detecting the second backup operation trigger:
     identifying a second service to which the second asset belongs;
     making a second determination that the client device manager presently maintains a second service-asset map for the second service;
     receiving, from the client device manager, a null value in response to a second query issued thereto based on the second determination;
     identifying, based on the null value, an asset backup plan for the second asset; and
     performing the second backup operation at least based on backup device metadata disclosed in the asset backup plan.

9. The method of claim 8, further comprising:
   prior to receiving the null value:
     issuing, based on the second determination and to the client device manager, a query comprising a service name associated with the second service and an asset name associated with the second asset,
     wherein the client device manager presently maintains the second service-asset map for the second service identified by the service name,
     wherein the second service-asset map excludes an asset entry identified by the asset name.

10. The method of claim 8, wherein the backup device metadata identifies a second non-centrally-managed backup device for storing an asset copy of the second asset produced during the second backup operation.

11. The method of claim 1, further comprising:
detecting a second backup operation trigger instigating a second backup operation targeting a second asset;
in response to detecting the second backup operation trigger:
identifying a second service to which the second asset belongs;
making a second determination that the client device manager does not presently maintain any service-asset maps for the second service;
identifying, based on the second determination, an asset backup plan for the second asset; and
performing the second backup operation at least based on backup device metadata disclosed in the asset backup plan.

12. A non-transitory computer readable medium (CRM) comprising computer readable program code, which when executed by a computer processor, enables the computer processor to:
detect a first backup operation trigger instigating a first backup operation targeting a first asset for backup to a non-centrally managed backup device;
in response to detecting the first backup operation trigger:
identify a first service to which the first asset belongs;
make a first determination that a client device manager presently maintains a first service-asset map for the first service;
receive, from the client device manager, centralized protection information in response to a first query issued thereto based on the first determination; and
perform an updated first backup operation at least based on the centralized protection information, wherein the updated first backup operation backs up the first asset to a centrally-managed backup device instead of the non-centrally managed backup device.

13. The non-transitory CRM of claim 12, comprising computer readable program code, which when executed by the computer processor, further enables the computer processor to:
prior to receiving the centralized protection information:
issue, based on the first determination and to the client device manager, a query comprising a service name associated with the first service and an asset name associated with the first asset,
wherein the client device manager presently maintains the first service-asset map for the first service identified by the service name,
wherein the first service-asset map comprises an asset entry identified by the asset name.

14. The non-transitory CRM of claim 12, wherein the centralized protection information comprises backup device metadata identifying the centrally-managed backup device for storing an asset copy of the first asset produced during the updated first backup operation.

15. The non-transitory CRM of claim 14, wherein the backup device metadata comprises a backup device hostname associated with the centrally-managed backup device, a backup storage device identifier associated with a backup storage device residing on the centrally-managed backup device, and backup device credentials for accessing the centrally-managed backup device.

16. The non-transitory CRM of claim 12, comprising computer readable program code, which when executed by the computer processor, further enables the computer processor to:
detect a second backup operation trigger instigating a second backup operation targeting a second asset;
in response to detecting the second backup operation trigger:
identify a second service to which the second asset belongs;
make a second determination that the client device manager presently maintains a second service-asset map for the second service;
receive, from the client device manager, a null value in response to a second query issued thereto based on the second determination;
identify, based on the null value, an asset backup plan for the second asset; and
perform the second backup operation at least based on backup device metadata disclosed in the asset backup plan.

17. The non-transitory CRM of claim 16, comprising computer readable program code, which when executed by the computer processor, further enables the computer processor to:
prior to receiving the null value:
issue, based on the second determination and to the client device manager, a query comprising a service name associated with the second service and an asset name associated with the second asset,
wherein the client device manager presently maintains the second service-asset map for the second service identified by the service name,
wherein the second service-asset map excludes an asset entry identified by the asset name.

18. The non-transitory CRM of claim 16, wherein the backup device metadata identifies a second non-centrally-managed backup device for storing an asset copy of the second asset produced during the second backup operation.

19. A system, comprising:
a client device manager comprising a first computer processor;
a client device operatively connected to the client device manager and comprising a second computer processor and an asset; and
a service and a backup agent both executing on the second computer processor, wherein the backup agent is programmed to:
detect a backup operation trigger instigating a backup operation targeting the asset for backup to a non-centrally-managed backup device;
in response to detecting the backup operation trigger:
identify the service to which the asset belongs;
make a determination that the client device manager presently maintains a service-asset map for the service;
receive, from the client device manager, centralized protection information in response to a query issued thereto based on the determination; and
perform an updated backup operation at least based on the centralized protection information, wherein the updated backup operation backs up the asset to a centrally-managed backup device instead of the non-centrally-managed backup device.

20. The system of claim 19, further comprising:
a plurality of backup devices operatively connected to the client device and comprising the centrally-managed backup device and the non-centrally-managed backup device,
wherein the centralized protection information comprises backup device metadata identifying the centrally-managed backup device for storing an asset copy of the asset produced during the updated backup operation.

* * * * *